Figure 1:
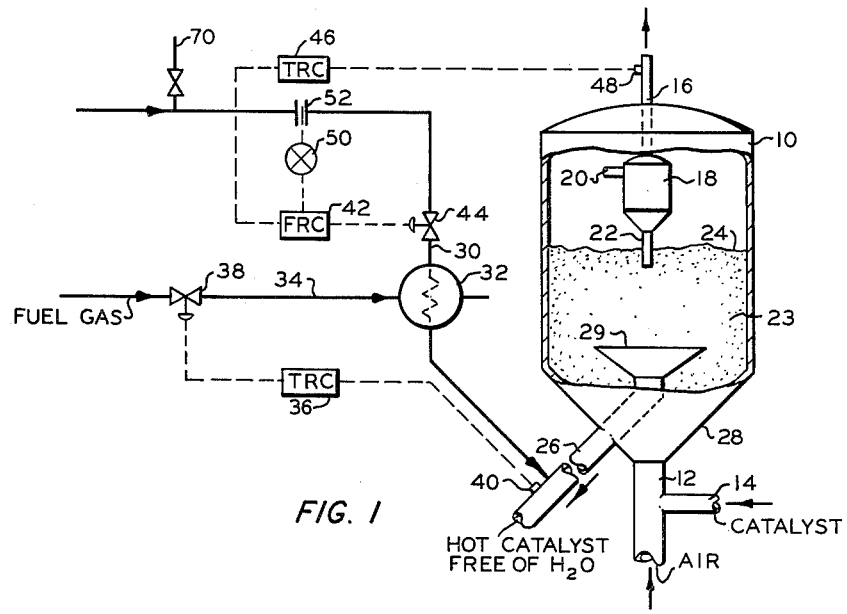

Aug. 21, 1962  L. W. MORGAN ET AL  3,050,469

CATALYST REGENERATION PROCESS AND APPARATUS

Filed May 25, 1959

INVENTORS
L.W. MORGAN
D.C. TABLER

BY  *Hudson & Young*

ATTORNEYS

United States Patent Office 3,050,469
Patented Aug. 21, 1962

3,050,469
CATALYST REGENERATION PROCESS
AND APPARATUS
Lyman W. Morgan, Golden, Colo., and Donald C. Tabler, Bartlesville, Okla., assignors to Phillips Petroleum Company, a corporation of Delaware
Filed May 25, 1959, Ser. No. 815,675
10 Claims. (Cl. 252—417)

This invention relates to a process and apparatus for controlling the regeneration and conditioning of a catalyst.

In many catalytic processes, particularly those involving hydrocarbon conversion reactions, such as the dehydrogenation of n-butane to butylenes, all or most of the heat for the reaction is supplied by introducing hot regenerated catalyst into the reaction zone at a temperature above reaction temperature. During the reaction the catalyst becomes contaminated with carbonaceous deposit and is cooled below the required temperature. The contaminated cooled catalyst is passed to a regenerator where it is contacted with an oxidizing gas, such as air or diluted air, so as to burn off the carbonaceous material and reheat the catalyst to the desired temperature. In most instances the heat of combustion of the carbonaceous deposit is insufficient to raise the temperature of the regenerated catalyst to the desired level and in order to do this, fuel gas and sufficient oxygen are introduced to the regeneration zone to burn the fuel to supply the additional heat requirements.

In many applications a catalyst is steam-sensitive so that it is desirable to purge or strip the catalyst of steam ($H_2O$ formed in the regenerator by combustion of $H_2$ with $O_2$) before returning the same to the reactor. Chromium oxide deposited on or admixed with gamma alumina is such a catalyst which is used in dehydrogenating n-butane to butylenes. Hence, it is desirable to regenerate this type of catalyst in such a manner as to produce a steam-free catalyst or to strip the steam therefrom before passing the same to the reaction zone. This invention is concerned with a catalyst regeneration process and control system which produces a regenerated catalyst free of occluded steam and at suitable temperature for the reaction process to which it is passed.

Accordingly, it is an object of the invention to provide an improved process and apparatus for regenerating and heating a catalyst contaminated with carbonaceous deposit in a reaction zone. Another object is to provide a method and control system for controlling the regeneration of a spent catalyst in a novel manner. A further object is to provide a process for regenerating a catalyst so as to avoid contaminating the catalyst with steam. Other objects of the invention will become apparent to one skilled in the art upon consideration of the accompanying disclosure.

A broad aspect of the invention comprises passing hot steam-free fuel gas thru the stream of catalyst from a regenerator to strip the catalyst of steam and passing the fuel gas into the regenerator where it is burned with injected oxidizing gas to provide the heat for heating the catalyst to the desired temperature for introduction to a high temperature reaction zone. The dry fuel gas is heated by indirect heat exchange in a suitable heat exchanger prior to its introduction into the catalyst conduit leading from the regenerator to the reactor. The preferred method is to pass the hot dry fuel gas thru the catalyst stream countercurrently thereto and out the end of the catalyst pick-up tube or conduit within the regeneration zone. A fuel gas heater utilizing any type of fuel gas to heat the heat exchange tubes is suitable for heating the dry fuel gas to be used as the stripping gas. In instances where an insufficient amount of fuel gas is required for supplying heat to adequately strip the outgoing catalyst of occluded steam, the dry fuel gas may be admixed with a suitable inert gas such as $CO_2$ flue gas, nitrogen, etc.

A commonly utilized catalyst in butane dehydrogenation comprises 5 to 50% chromium oxide, at least partially in the form of $Cr_2O_3$, deposited on gamma alumina. This type catalyst is readily regeneratable but is subject to oxidation during regeneration with excess air ($O_2$) and is also steam-sensitive in that it loses its activity more quickly in the presence of steam. Other catalysts which are steam sensitive include the numerous aluminum oxide-supported metal oxide catalysts or aluminum oxide promoted with one or more metals or metal oxides. Gamma alumina is frequently associated with promoters or catalysts such as the group VI B metal oxides including Cr, Mo, W and U; Mn from group VII; Fe, Co, Ni, in the oxide or in metallic form and Pd or Pt metals of group VIII; V and Cb and Ta from group V; and copper and silver from group I. It is believed that because porous active alumina preferentially adsorbs steam, the adsorbed $H_2O$ masks the active catalyst points in the catalyst structure thereby reducing its activity. Hence, any catalyst containing active porous alumina, as one of its essential elements, is materially and deleteriously affected by contact with steam in the reaction zone. The process of the invention is applicable to any of the catalysts enumerated above and it is to be understood that such other catalysts are included when chromium oxide on alumina is discussed hereinafter as illustrative of the invention.

It is advantageous to subject a catalyst such as chromium oxide on alumina after regeneration in the manner described, to reduction with hydrogen in order to condition the catalyst for the dehydrogenation step. One aspect of the invention comprises stripping the effluent catalyst from the regenerator with a dry fuel gas consisting essentially of hydrogen and normally gaseous hydrocarbon such as methane, ethane, propane, etc. In this manner the reducing action of the hydrogen conditions the catalyst for use in the butane dehydrogenation step and improves its activity therein and the catalyst is simultaneously stripped of $H_2O$.

In butane dehydrogenation utilizing a fluidized type catalyst and an adiabatic reactor the catalyst temperature is of the order of 1200° F. as it is passed into the reactor. The hot stripping gas (fuel gas) passing thru the catalyst stream at this approximate temperature level efficiently strips occluded gases, such as steam, from the powdered catalyst.

It is also feasible to utilize $CO_2$ as the oxidation gas for removing carbonaceous deposit from the deactivated catalyst since this gas reacts with carbon to form CO. By controlling the amount of free $O_2$-containing gas (air) at no more than the stoichiometric equivalent of the fuel in the stripping gas, no free oxygen is left in the regeneration zone to oxidize the chromium oxide in the catalyst to the higher oxides and it is not necessary when operating in this manner to utilize hydrogen in the stripping gas and any dry fuel gas may be utilized.

Figure 2:
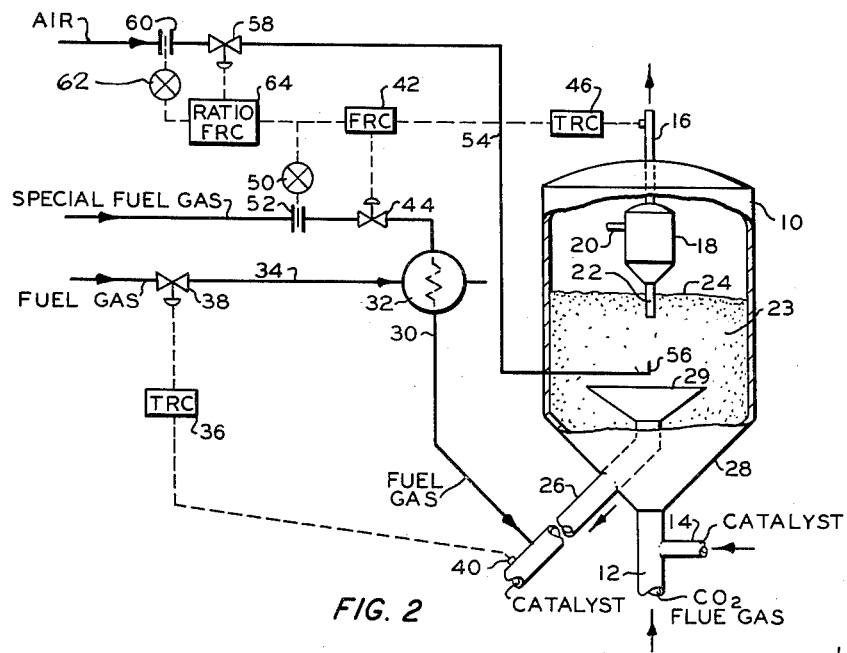

A more complete understanding of the invention may be had from a consideration of the accompanying schematic drawing of which FIGURE 1 is an elevation partly in section showing one arrangement of apparatus for effecting the invention; and FIGURE 2 is a similar view showing another embodiment of the invention.

Referring to FIGURE 1, a regenerator 10 is provided with an inlet conduit 12 in its bottom section for introduction of deactivated catalyst from line 14 together with air injected directly into conduit 12. A vent line or stack 16 connects with a cyclone separator 18 inside of the regenerator. Cyclone 18 comprises an intake line 20 and a solids delivery line 22 which extends into the dense phase of catalyst bed 23, the upper boundary of which is designated by numeral 24. A catalyst withdrawal line 26 extends into the central area of a lower section of the regenerator thru conical bottom 28, terminating in conical intake 29. A fuel gas line 30 passes thru an indirect heat exchanger 32 and connects with catalyst effluent line 26 so as to provide a stripping chamber between the junction of these two lines and the catalyst intake 29 within the regenerator. Heat exchanger 32 is a gas fired heater supplied by fuel gas thru line 34. Temperature-recorder-controller 36 controls a flow control valve 38 in line 34 by sensing catalyst temperature at 40 in line 26 and regulating the amount of fuel gas supplied to heater 32 so as to maintain a set catalyst temperature.

A flow-recorder-controller 42 operates valve 44 in fuel gas line 30 in response to instrument 46 which is a temperature-recorder-controller sensitive to gas temperature in stack 16 at 48. Instrument 42 senses the flow rate in line 30 thru transducer 50 which connects with orifice 52 and puts out a signal in proportion to the gas flow rate therein and this signal is utilized by instrument 42 to limit the opening or closing of valve 44 in response to the signal obtained from instrument 46. Instrument 42 is set for a given flow rate and this flow rate is changed by instrument 46 which overrides instrument 42, changing the set point thereof. In other words, temperature-recorder-controller 46 is responsive to gas temperature in stack 16, measured at 48, and the signal from controller 46 manipulates the set point of flow-recorder-controller 42 so as to cause the latter to adjust the position of valve 44 to maintain a substantially constant temperature in stack 16.

Referring to FIGURE 2 corresponding elements are correspondingly numbered to those of FIGURE 1. In addition to the apparatus and arrangement of controls shown in FIGURE 1, FIGURE 2 includes an air line 54 leading into the regenerator 10 and connected with a nozzle or gas distributor element 56 which delivers air into the effluent stream of fuel gas from line 26. Air line 54 is provided with a flow control valve 58, an orifice 60 upstream thereof, and transducer 62 for sensing the air flow rate thru orifice 60 and sending out a signal proportional to the flow rate which is picked up by a ratio-flow-controller 64. This ratio controller also receives a signal from transducer 50 proportional to the flow rate of fuel gas in line 30 as sensed in orifice 52. When instrument 46 senses an increase or decrease in temperature in the effluent gas in stack 16 from the set temperature of the instrument, the signal sent to flow-recorder-controller 42 is varied so as to decrease or increase the flow-rate of fuel gas in line 30 to compensate for the increase or decrease in temperature of the effluent gas (stack 16). Ratio controller 64 then senses the decreased or increased flow rate of fuel gas in line 30 thru instrument 50 and because it is sensitive to flow rate in line 54 and is set to maintain a fixed ratio of air to fuel gas, it increases or decreases the flow rate of air in line 54 to maintain a fixed ratio of the flow rate of air to that of fuel gas.

In operation with the apparatus shown in FIGURE 1, a catalyst to be regenerated and heated is introduced in conventional manner to conduit 12 via line 14 where it is carried into the regenerator 10 by air (or diluted air) ascending line 12 so as to form a fluidized catalyst bed, the upper level of the dense phase of which is designated by numeral 24. Catalyst is continually introduced in this manner and a regenerated heated catalyst is continually withdrawn thru line 26. The effluent gases from the regenerator pass thru cyclone 18 via inlet 20 and are vented thru stack 16, with the catalyst fines returning to the catalyst bed thru downcomer 22.

Catalyst entering the regenerator is contaminated with carbonaceous deposit picked up in the reaction zone, such as in the dehydrogenation of butane to butenes. The deposit comprises carbon and solid and semi-solid hydrocarbons formed by polymerization and other side reactions in the reaction zone. The burning of these deposits forms $H_2O$, at least a portion of which is carried out of the regenerator in the effluent catalyst stream in line 26. Since steam in the catalyst and in the reaction zone has a deteriorating effect on many catalysts, such as on chromia-alumina catalyst used in butane dehydrogenation, hot fuel gas heated in heater 32 is passed via line 30 into catalyst effluent line 26 downstream catalyst-wise of the regenerator and the hot fuel gas passes thru this line into the regenerator countercurrently to the catalyst. The amount of fuel gas introduced to the regenerator is controlled so as to maintain suitable effluent gas temperature in stack 16, thereby effectively controlling the outlet temperature of the regenerated catalyst. In butane dehydrogenation, the effluent catalyst temperature is maintained in the range of about 1150 to 1225° F. Where desired, the effluent catalyst temperature is maintained at a level 25 to 50° lower than the desired reactor entry temperature and the additional heat required to bring the catalyst temperature up to the desired reactor entry temperature is supplied by the hot fuel gas admitted to the catalyst effluent line from fuel line 30. By sensing the temperature of the catalyst at 40 in the catalyst effluent line by means of instrument 36 the rate of flow of fuel gas in line 34 to heater 32 is regulated so as to maintain the effluent catalyst at the desired temperature. It is of course to be understood that fuel gas entering the system thru line 30 is burned in regenerator 10 in catalyst bed 23 by means of air utilized as the transport and fluidizing gas and entering thru conduit 12. In addition to regulating the temperature of the injected fuel gas, the quantity or flow rate is regulated by means of instruments 46, 42, 50 and valve 44 so as to maintain the desired effluent gas temperature in stack 16.

The amount of fuel gas or the rate of injection thereof to the regenerator depends upon the amount of carbonaceous material burned off the catalyst by the air admitted thru conduit 12. Where the carbonaceous deposit is heavy a small amount or low flow rate of fuel gas in line 30 is required to raise the temperature of the catalyst to the desired level. In instances where the volume of fuel gas injected thru line 30 to conduit 26 is inadequate to effectively strip the effluent catalyst of occluded steam, an inert gas, such as $CO_2$, flue gas, nitrogen, etc., is injected into the line 30 upstream of the heater via line 70.

In operation with the arrangement of apparatus shown in FIGURE 2, catalyst is introduced in the same manner to the bottom of regenerator 10 but $CO_2$ or flue gas devoid of free-oxygen-containing gas is introduced thru line 12 as a transport and fluidizing gas. This gas oxidizes carbon on the catalyst to CO and is, itself, converted to CO which has a reducing effect on the regenerated catalyst. Fuel gas is introduced to catalyst effluent line 26 as a stripping gas in the same manner as in FIGURE 1 but the air for combustion of the fuel gas is introduced thru line 54 and distributor 56, and the flow rate of air is regulated to introduce no more than the stoichiometric quantity for oxidizing the fuel gas, and is preferably slightly less than the stoichiometric equivalent of the fuel gas for complete oxidation. In this manner oxidation of the catalyst to the higher oxide state is avoided and the problem of conditioning the catalyst for use in the reaction zone is materially minimized. However, sufficient hydrogen may be included in the fuel gas admitted thru line 30 to have a reducing effect upon the catalyst, although it is not essential in operating in accordance with the foregoing process wherein free-oxygen is avoided in the regeneration zone. In operation in accordance with the process outlined for FIGURE 1, it is still desirable to incorporate in the injected fuel gas at least 20 volume percent of hydrogen in view of the oxidizing effect of the air introduced as the fluidizing gas to bed 23.

The flow rate of fuel gas to regenerator 10 is controlled in FIGURE 2 in similar manner to the control in FIGURE 1, i.e., so as to maintain a fixed effluent gas temperature in stack 16 by means of temperature-recorder-controller 46 which senses the temperature in the stack and controls flow-recorder-controller 42 which is in control of motor valve 44 in line 30. As the flow rate of fuel gas in line 30 is varied to compensate for changes in temperature in stack 16, the changed flow rate is sensed by instrument 50 and this instrument sends out a signal to ratio-flow-rate-controller 64 which also senses the flow rate of air in line 54 thru instrument 62 and varies the set of motor valve 58 so as to maintain the desired ratio of air to fuel gas as the flow rate of fuel gas is changed.

The following example is illustrative of one embodiment of the invention applicable to the apparatus arrangement of FIGURE 2.

*Example*

Chromium oxide-alumina catalyst in powdered form from a butane dehydrogenation reactor is passed to regenerator 10 via line 14 and conduit 12 at a temperature of 1050° F. and at the rate of about 100 pounds per minute. The carbonaceous deposit on the catalyst is 0.3 pound per 100 pounds of catalyst. $CO_2$ at 100° F. and at the rate of 3.3 pounds per minute is introduced thru conduit 12 as the fluidizing and oxidizing gas for the oxidation of carbonaceous deposit.

Methane containing 10 mol percent $H_2$ and at a temperature of 1200° F. is passed thru line 30 and conduit 26 into the regenerator, stripping steam from the catalyst which is withdrawn thru conduit 26 at the rate of 100 pounds per minute. The fuel gas represents a feed rate of $CH_4$ of 0.407 pound per minute and of $H_2$ of 0.0057 pound per minute. Air for combustion is introduced to the regenerator via line 54 at a temperature of 100° F. at the rate of 1.67 pounds of $O_2$ per minute, along with 5.51 pounds of $N_2$ (stoichiometrically equivalent to the fuel). Regenerated, unoxidized catalyst is returned to the reactor via conduit 26 at the rate of 100 pounds per minute and at a temperature of 1200° F. The stack gas consists of 5.51 pounds of $N_2$, 3.32 pounds of $CO_2$, 1.40 pounds of CO, and 0.97 pounds $H_2O$, (per min.) and is at a temperature of 1200° F.

The foregoing conditions are maintained relatively constant by the control system of FIGURE 2.

The reactions involved in the regeneration and heating are as follows:

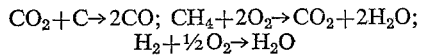

Certain modifications of the invention will become apparent to those skilled in the art and the illustrative details disclosed are not to be construed as imposing unnecessary limitations on the invention.

We claim:
1. In a process wherein a steam-sensitive solid catalyst contaminated with hydrocarbon and other carbonaceous deposit is removed from a reaction zone to be reheated and regenerated before being returned to the reaction zone; said catalyst is passed to a regeneration zone where it is heated and regenerated by burning in contact therewith a hydrocarbon-containing fuel gas with $O_2$-containing gas in excess of the amount required to burn said fuel gas, thereby burning said deposit from said catalyst and forming steam in said regeneration zone; and the regenerated hot catalyst containing steam is passed from said regeneration zone to said reaction zone, the improvement comprising stripping said hot catalyst of steam by contacting same with at least a portion of said fuel gas free of moisture, at elevated temperature, then passing the resulting fuel gas into said regenerator as fuel, whereby said regenerated catalyst is substantially moisture-free; and passing resulting moisture-free catalyst into said reaction zone.

2. The process of claim 1 wherein said fuel gas contains a substantial concentration of $H_2$ and is passed thru said catalyst countercurrently thereto as said catalyst passes from said regeneration zone toward said reaction zone.

3. The process of claim 1 wherein the temperature of said regenerated catalyst as it leaves said regeneration zone is maintained below the desired reaction zone entry temperature, and said fuel gas is maintained at a temperature above said entry temperature so as to raise the temperature of said catalyst to said entry temperature.

4. The process of claim 1 wherein the volume of fuel gas required is relatively low and an inert dry gas is admixed with said fuel gas to increase the volume of stripping gas.

5. The process of claim 1 wherein the fuel gas is dispersed into the central portion of a fluidized bed of said catalyst and the free-$O_2$-containing gas is injected into the dispersing fuel gas.

6. The process of claim 1 wherein said catalyst comprises chromium oxide in admixture with gamma alumina.

7. A process for regenerating and conditioning a steam sensitive particulate oxidizable metal oxide catalyst contaminated with carbonaceous deposit for return to a catalytic hydrocarbon conversion reaction, which comprises transporting a suspension of said catalyst in $CO_2$ substantially free of $O_2$ into a regeneration zone; maintaining a fluidized dense bed of said catalyst in said zone; burning a stream of moisture-free fuel gas with stoichiometric amount of air separately introduced to a central area of said bed to maintain an elevated temperature therein sufficient to react said $CO_2$ with said deposit to form CO; withdrawing a stream of regenerated catalyst from said zone; and feeding said fuel gas into said central area of said bed countercurrently thru the effluent stream of regenerated catalyst to strip same of steam and to provide a moisture-free regenerated catalyst.

8. The process of claim 7 wherein the temperature of said fuel gas is regulated to bring the temperature of the effluent catalyst to the desired temperature for use in said reaction.

9. The process of claim 7 wherein said catalyst comprises chromium oxide in admixture with gamma alumina.

10. Apparatus comprising in combination a catalyst regenerator adapted to maintain a fluidized bed of catalyst therein and having a catalyst inlet line, a catalyst outlet line extending from a central section of said catalyst bed, an inlet line for $O_2$-containing gas in a lower section with its delivery end adjacent the intake end of said catalyst outlet line and in the path of catalyst flowing out of said bed, and a gas outlet line in an upper section thereof; a fuel gas line leading into said catalyst outlet line at a point spaced a substantial distance from said regenerator; a first flow control valve in said inlet line for $O_2$; a second flow control valve in said fuel gas line; a flow rate controller in control of said second valve; a first flow rate sensing means in said $O_2$ line upstream of said first valve; a temperature controller sensitive to the temperature in said gas outlet line in control of said flow rate controller; a second flow rate sensing means in said fuel gas line upstream of said second valve; a ratio flow controller in control of said first valve being sensitive to said first and second flow rate sensing means and to said flow rate controller; an indirect heat exchanger in said fuel gas line and a temperature controller sensitive to catalyst temperature in said catalyst outlet line downstream catalyst-wise of said fuel line in control of the rate of heating in said heat exchanger.

References Cited in the file of this patent

UNITED STATES PATENTS

| | | |
|---|---|---|
| 2,437,334 | Roetheli | Mar. 9, 1948 |
| 2,667,521 | Harney | Jan. 26, 1954 |
| 2,672,490 | Roetheli | Mar. 16, 1954 |

FOREIGN PATENTS

| | | |
|---|---|---|
| 119,350 | Australia | Dec. 30, 1944 |